Oct. 11, 1932.  A. W. MORTON  1,881,849
PISTON RING
Filed Dec. 27, 1930  2 Sheets-Sheet 1

Inventor:
Allen W. Morton
By Dodge and Sons
Attorneys

Oct. 11, 1932.  A. W. MORTON  1,881,849
PISTON RING
Filed Dec. 27, 1930  2 Sheets-Sheet 2
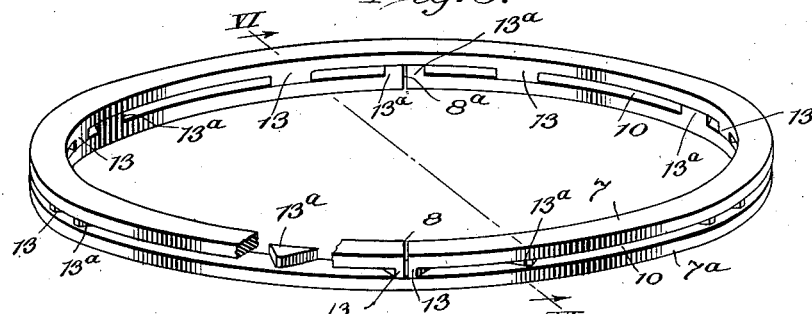
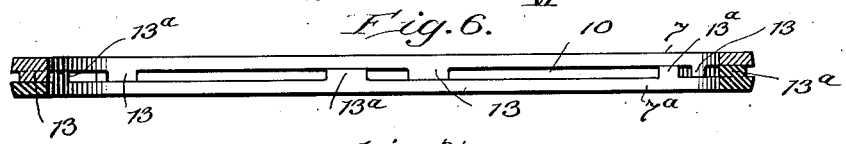
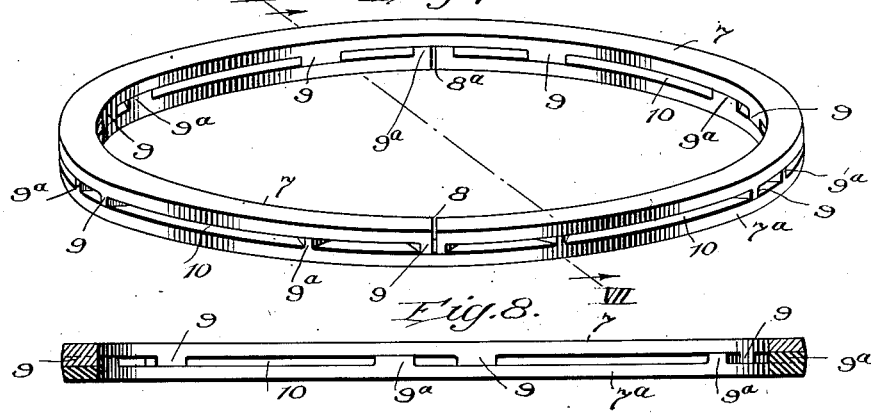
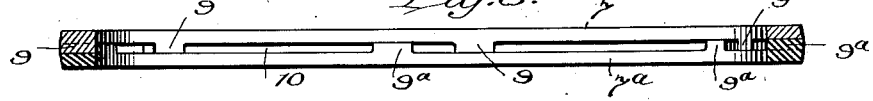
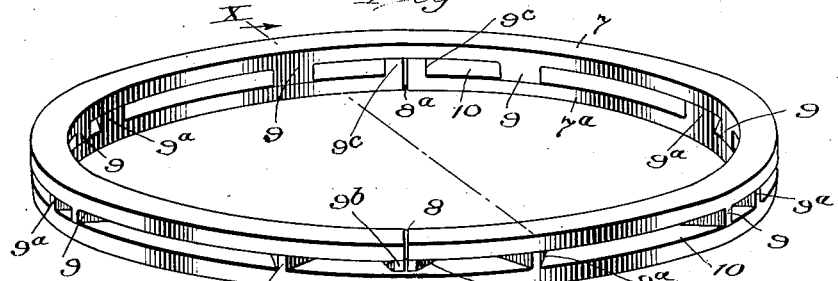
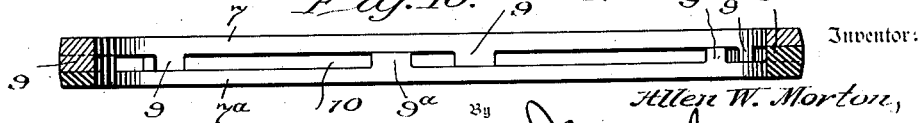
Inventor:
Allen W. Morton,
By
Attorneys Patented Oct. 11, 1932

1,881,849

UNITED STATES PATENT OFFICE

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND

PISTON RING

Application filed December 27, 1930. Serial No. 505,139.

This invention pertains to piston rings and more particularly to oil control rings commonly employed in internal combustion engines.

The main object of the present invention is to provide a ventilated ring which, by reason of its formation, will maintain the openings extending therethrough clean of matter which would otherwise tend to accumulate therein.

Stated in another way, an object of the invention is to provide axially extending projections upon each of the two ring elements, which projections extend into the spaces formed between the projections on the opposite ring element, the two ring elements or sections being free to rotate relatively to each other by reason of the fact that the projections are narrow and spaced relatively far apart, whereby the projections act as scouring or scraping means to keep the spaces between the projections upon each of the ring elements clean.

Figure 1:
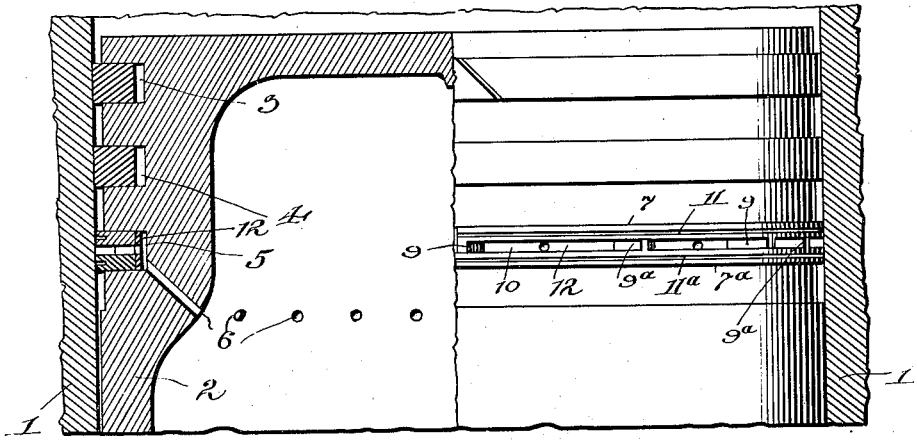
Figure 2:
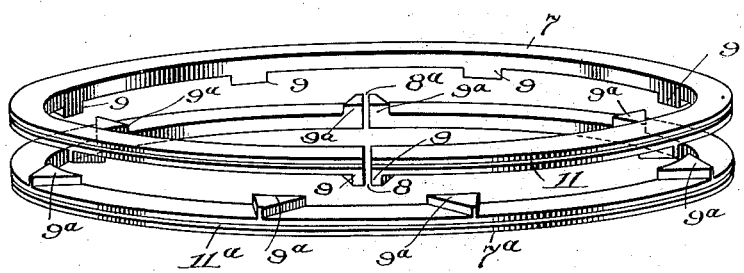
Figure 3:
Figure 4:
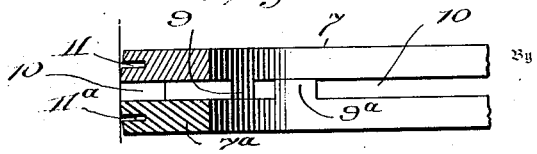

Several embodiments of my invention are shown in the annexed drawings wherein:

Figure 1 is a sectional elevation of a portion of a piston and cylinder with an oil control ring falling within the present invention shown in position upon the piston;

Figure 2, a perspective view of two ring elements shown slightly separated;

Figure 3, a similar view with the ring sections or elements in position with reference to each other;

Figure 4, a transverse vertical section taken on the line IV—IV of Figure 3;

Figure 5, a perspective view partly broken away showing two elements forming a ring with slightly modified forms or projections extending from each of the ring sections;

Figure 6, a transverse sectional view taken on the line VI—VI of Figure 5;

Figure 7, a perspective view of a ring wherein a further modification is shown;

Figure 8, a sectional view taken on the line VIII—VIII of Figure 7;

Figure 9, a perspective view of a still further modification; and

Figure 10, a sectional view on the line X—X of Figure 9.

The ring, in all of the forms shown, may be said to comprise, in the main, two annular sections of like diameter, each provided upon one face with a series of spaced axially extending lugs or projections, which when the two sections are assembled with the lugs extending in opposite directions, or toward the other section, contact the face of the spaces upon the opposite ring section formed between said projections.

Referring first to Figures 1 to 4, 1 denotes a portion of a cylinder, 2 a piston having three ring receiving grooves 3, 4, and 5 formed therein, the latter being designed to receive the oil control ring which forms the basis of the present invention. Said groove 5 is in communication with the interior of the piston through drainage openings 6, as is usual, so that the oil collected by the ring from the cylinder wall may pass back into the sump.

As above noted, the ring is composed of two sections of like form and in the drawings the sections or elements are similarly lettered with the exponent "$a$" added to the second or lower element. The annular sections of the rings are denoted by 7 and $7^a$, respectively, said sections being split transversely as at 8 and $8^a$, the cuts producing the splits passing through one of the lugs now to be described.

Extending axially from one face of the ring section 7 is a series of lugs or projections 9, the lugs being spaced apart and their outer ends lying in a common plane. Lugs $9^a$ of similar form and dimensions extend upwardly from the lower ring section or element $7^a$. The two ring sections are brought together in the position shown in Figure 3 with the lugs 9 extending inwardly between the lugs $9^a$ and contacting the face of the ring section $7^a$ lying between the lugs $9^a$. As will be seen, when the ring sections are assembled or placed together, as in Figure 3, drainage spaces or openings are formed extending from the inner to the outer side of the ring between the lugs. Such openings are designated by 10.

In assembling the ring sections joints 8 and

8ª will be off-set and preferably placed diametrically opposite each other (best shown in Figure 3).

Preferably in the formation of the ring a single casting will be utilized and the spaces and the lugs which define the same will be produced by a milling cutter or saw against which the ring is moved or, conversely, the cutter moved toward the ring casting, there-by producing the triangular-shaped lugs 9 and 9ª and the intervening spaces. A casting may then be cut in a plane at right angles to the axis of the ring producing the two ring sections 7 and 7ª with the spaced lugs 9 and 9ª. These lugs, in the form shown in Figures 1 to 4, extend to the periphery of the ring.

It is conceivable, of course, that the two sections 7 and 7ª with the various lugs and intervening spaces may be separately produced.

When the two ring sections 7 and 7ª are assembled and mounted in the groove 5 the splits or openings 8 and 8ª will be practically closed and the sections, which may be given the desired tension by any approved means, will contact the cylinder wall. It will likewise be noted that the two ring sections are free to move one with reference to the other about the axis of the ring. Such movement causes the lugs or projections 9 and 9ª to scrape or scour the opposite face of the ring members which they contact, thus eliminating the possibility of said drainage or ventilated openings formed by the lugs and the opposite faces of the ring sections becoming clogged or stopped up.

Preferably the upper ring section 7 will be provided with an annular groove, as 11, extending entirely around its outer cylinder contacting face and a similar groove 11ª will be formed upon the lower element 7ª. These grooves tend to collect and distribute oil over the surface of the cylinder to a sufficient extent to insure proper lubrication while the openings between the ring sections afford proper drainage for the oil and thus prevent pumping of the oil and excess lubrication.

The ring made up of the two sections, as above described, may be employed with a perforate expander ring, denoted by 12, such ring preferably being of the type shown and claimed in Letters Patent to me Number 1,723,432. The presence of such ring is not, however, essential where proper tension is given or imparted to the ring sections prior to the placement of the ring in the groove.

In Figures 5 and 6 the lugs or projections extending from the adjacent faces of the ring sections, and designated by 13 and 13ª, do not extend to the peripheral face of said sections and consequently to the peripheral face of the ring except and only adjacent the splits in said ring sections. The reduction of such lugs or projections may be produced by dragging a cutter around the ring sections or, conversely, rotating the ring sections with reference to a cutter, and lifting the cutter, or moving the ring sections away from the cutter, when the joints in the ring sections are approached or when the lug through which the split or cut is to be formed is approached. This arrangement produces a continuous groove around the periphery of the ring when the sections are assembled except as it is interrupted by the outwardly projecting lugs at the joints of the ring sections. The openings 10, of course, extend into this groove.

In Figures 7 and 8 a structure such as is shown in Figures 1 to 4 is disclosed except that the lugs are of less height and consequently the drainage openings or channels 10 formed between the ring elements are shallower.

In Figures 9 and 10 the lugs are shown as of greater length than those in the other figures and as a consequence the drainage openings or passages 10 are wider. In this instance the lugs, designated by 9ᵇ and 9ᶜ, adjacent the splits do not extend to the peripheral face of the ring sections and consequently to the peripheral face of the ring when the parts are assembled.

In all the forms the outer or cylinder contacting surface is shown as curved or crowned. This may be produced mechanically by lapping though, as will be understood, a ring presenting a perfectly flat surface will, in use, become crowned.

What is claimed is:

1. A piston ring formed of two annular members shiftable about a common axis relatively to each other and each provided with a plurality of spaced lugs, the lugs of one member projecting toward and contacting the adjacent face of the opposite member intermediate the lugs of the other member.

2. A piston ring formed of two annular members movable about a common axis relatively to each other and each provided with a plurality of spaced lugs, the lugs of one member projecting toward and contacting the adjacent face of the opposite member intermediate the lugs of the other member, the lugs on each member being spaced apart a distance greater than the width of the lugs.

3. A piston ring formed of two annular members each provided with a plurality of spaced lugs, the lugs of one member at least projecting toward and contacting the adjacent face of the opposite member between the lugs thereon, the annular members being rotatable relatively to each other about a common axis.

4. A piston ring composed of two annular members movable about a common axis relatively to each other and each member being split and each provided with a plurality of spaced lugs, the lugs of one member projecting toward and contacting the adjacent faces of the opposite member between the lugs thereon, there being a lug on each member adjacent each end of each of said annular members at the split therein.

5. A piston ring formed of two annular members free of connection with each other and shiftable with reference to each other about a common axis; means carried by at least one of said members and forming with the other member drainage channels or openings extending through the ring; and means carried by the other annular member for clearing the slots or channels of any matter which may tend to accumulate therein.

6. A piston ring formed of two annular split members each provided with a plurality of spaced lugs, the lugs of one member projecting toward and contacting the adjacent face of the opposite member between the lugs thereon, said lugs being spaced apart a distance greater than the width of the lugs and standing inwardly of the outer face of the annular members except at the splits therein.

7. A piston ring formed of two annular members each provided with a plurality of spaced lugs, the lugs of one member projecting toward and contacting the adjacent face of the opposite member between the lugs thereon and a groove extending around the cylinder contacting face of at least one of said annular members.

8. A piston ring formed of two annular members shiftable about a common axis relatively to each other and each provided with a plurality of spaced lugs, the lugs on one member projecting toward and contacting the adjacent face of the opposite member between the lugs thereon, the lugs on each member being spaced apart a distance greater than the width of the lugs, said annular members being split and having lugs formed at the ends of the splits, whereby the members may be rotated relatively to each other and the splits therein prevented from coming into alignment.

In testimony whereof I have signed my name to this specification.

ALLEN W. MORTON.